(12) United States Patent
Marketsmueller

(10) Patent No.: US 8,237,710 B1
(45) Date of Patent: Aug. 7, 2012

(54) METHODS AND APPARATUS FOR FILL RULE EVALUATION OVER A TESSELLATION

(75) Inventor: Sebastian Marketsmueller, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 349 days.

(21) Appl. No.: 12/550,020

(22) Filed: Aug. 28, 2009

(51) Int. Cl.
*G06T 15/30* (2011.01)

(52) U.S. Cl. .................. 345/423; 345/419; 345/420

(58) Field of Classification Search .................. None
See application file for complete search history.

(56) References Cited

U.S. PATENT DOCUMENTS

| | | | |
|---|---|---|---|
| 5,859,647 A | 1/1999 | Kurumida | |
| 6,545,676 B1 * | 4/2003 | Ryan et al. | 345/423 |
| 6,940,505 B1 * | 9/2005 | Savine et al. | 345/423 |
| 7,239,319 B2 | 7/2007 | Loop | |
| 7,889,209 B2 * | 2/2011 | Berger et al. | 345/585 |
| 2002/0033821 A1 * | 3/2002 | Sfarti | 345/423 |
| 2004/0196285 A1 * | 10/2004 | Rice et al. | 345/423 |

OTHER PUBLICATIONS

Loop, Charles and Blinn, Jim; Resolution Independent Curve Rendering using Programmable Graphics Hardware, SIGGRAPH Proceedings, pp. 1000-1010, 2006.
Nehab, Diego; Hoppe Hugues; Random-access rendering of general vector graphics, ACM Transactions on Graphics, vol. 27, Issue 5 (Dec. 2008), Article 135.
Green, Chris; Improved alpha-tested magnification for vector textures and special effects, ACM SIGGRAPH 2007 courses, Course 28, Advanced real-time rendering in 3D graphics and games, pp. 9-18, 2008.
Qin, Zheng; McCool, Michael D.; Kaplan, Craig; Precise vector textures for real-time 3D rendering, Proceedings of the 2008 symposium on Interactive 3D graphics and games, pp. 199-206, 2008.

* cited by examiner

*Primary Examiner* — Said Broome
(74) *Attorney, Agent, or Firm* — Robert C. Kowert; Meyertons, Hood, Kivlin, Kowert & Goetzel, P.C.

(57) ABSTRACT

Various embodiments of methods and apparatus for performing vector artwork fill rule evaluation over a tessellation are described. In some embodiments the geometric shapes of vector artwork are approximated by line segments, then tessellated into simple convex polygons (i.e. tessellation primitives). Fill rules for geometric primitives of the vector artwork are assigned to edges of the tessellation primitives. In some embodiments, fill rules for boundary edges are evaluated using background state information to assign fill values to tessellation primitives. State information for filled tessellation primitives is used by fill rules to determine fill values for unfilled tessellation primitives. Embodiments may provide detection of conflicting fill rules in the vector artwork, and may perform corrective actions on tessellation primitives.

20 Claims, 7 Drawing Sheets

METHODS AND APPARATUS FOR FILL RULE EVALUATION OVER A TESSELLATION

DESCRIPTION OF THE RELATED ART

Vector artwork uses geometrical primitives such as lines and quadratic Bezier curves to represent images. The lines and curves are expressed using mathematical equations. This representation of an image by equations allows vector artwork to be scaled to an arbitrary size without degrading. In contrast, raster artwork represents an image with an array of pixels, or picture elements. Raster artwork may lose clarity when scaled. However, unlike raster artwork, vector artwork cannot be displayed directly.

To be displayed vector artwork must be rendered, in other words converted from a collection of mathematical equations to a set of pixels with defined visual characteristics (e.g. colors, opacity, texture). The pixels within areas bounded by the lines and curves of the vector artwork may be assigned visual characteristics using fill rules.

An example of a fill rule for an area in vector artwork is the even-odd rule. The even-odd rule conceptually draws a ray from a pixel inside a closed area to infinity and counts the number of paths (lines or curves) that the ray crosses. If the number of paths crossed is odd then the pixel is "inside" and may be given the color for "inside", otherwise the pixel is "outside" and may be given an "outside" color. Other, arbitrarily complex, fill rules can be constructed.

Rendering vector artwork may be done using a scan line method that scans across the image, one line of pixels at a time, assigning visual characteristics to pixels. When the scan encounters a line in the image that forms a boundary of a closed area, a fill rule for the closed area is evaluated to determine the visual characteristic of the next pixel. Pixels are assigned the newly determined visual characteristic until another line in the image is encountered. The fill rules for vector artwork are well defined per scan line and work well for scan line rendering.

The scan line rendering method is not well suited for use with many graphics hardware accelerators. These accelerators process polygons, typically triangles, to render an image into pixels. Stencil based rendering techniques that operate on a pixel at a time can be used with graphics hardware accelerators, but are expensive in terms of the computational power that required.

SUMMARY

Various embodiments of methods and apparatus for vector artwork fill rule evaluation over a tessellation are described. In some embodiments geometric primitives of the vector artwork are approximated by line segments, then the line segments are tessellated into sets of tessellation primitives. Edges of the tessellation primitives that represent edges in the vector artwork are assigned fill rules from the vector artwork. The fill rules for tessellation primitive edges evaluate state information and select a fill value for a tessellation primitive. In some embodiments, fill rules specified in the vector artwork may be arbitrarily complex, and/or the vector artwork may specify multiple types of fill rules. In some embodiments fill values of tessellation primitives on a boundary of the tessellated artwork are determined using background state information as input to the fill rules for boundary edges. The fill values for boundary tessellation primitives may be used as state information for fill rules to determine fill values for adjacent tessellation primitives. Using the state of fill rule evaluation for a tessellation primitive as input state information to a fill rule to determine the fill value for an adjacent tessellation primitive may be repeated to assign fill values to all tessellation primitives.

In some embodiments conflicting fill rules in the vector artwork are detected. Conflicting fill rules produce different fill values for the same area of the vector artwork. Corrective actions may be taken to produce a set of tessellation primitives in which each tessellation primitive has a single value.

Embodiments may provide preparation of tessellation primitives for processing by a graphics hardware processor, such as a graphics processing unit (GPU).

The methods described herein may be implemented as program instructions, (e.g., stored on computer-readable storage media) executable by a CPU and/or graphics processing unit (GPU), in various embodiments. For example, they may be implemented as program instructions that, when executed, implement a rendering operation in response to user input.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for vector artwork fill rule evaluation over a tessellation are described. Vector artwork is converted to a set of tessellation primitives. In some embodiments the geometric primitives of the vector artwork are approximated by line segments, then tessellated into simple convex polygons (i.e. tessellation primitives). Fill rules for geometric primitives of the vector artwork may be assigned to edges of the tessellation primitives that represent edges in the vector artwork. Fill rules for edges may be evaluated to select fill values (e.g. colors) for the tessellation primitives. State information, including fill values, for filled tessellation primitives may be used by fill rules to determine fill values for unfilled tessellation primitives. Embodiments may provide detection of conflicting fill rules in the vector artwork, and may perform corrective actions on the set of simple polygons.

Converting Vector Artwork into Displayable Pixels

Figure 1:
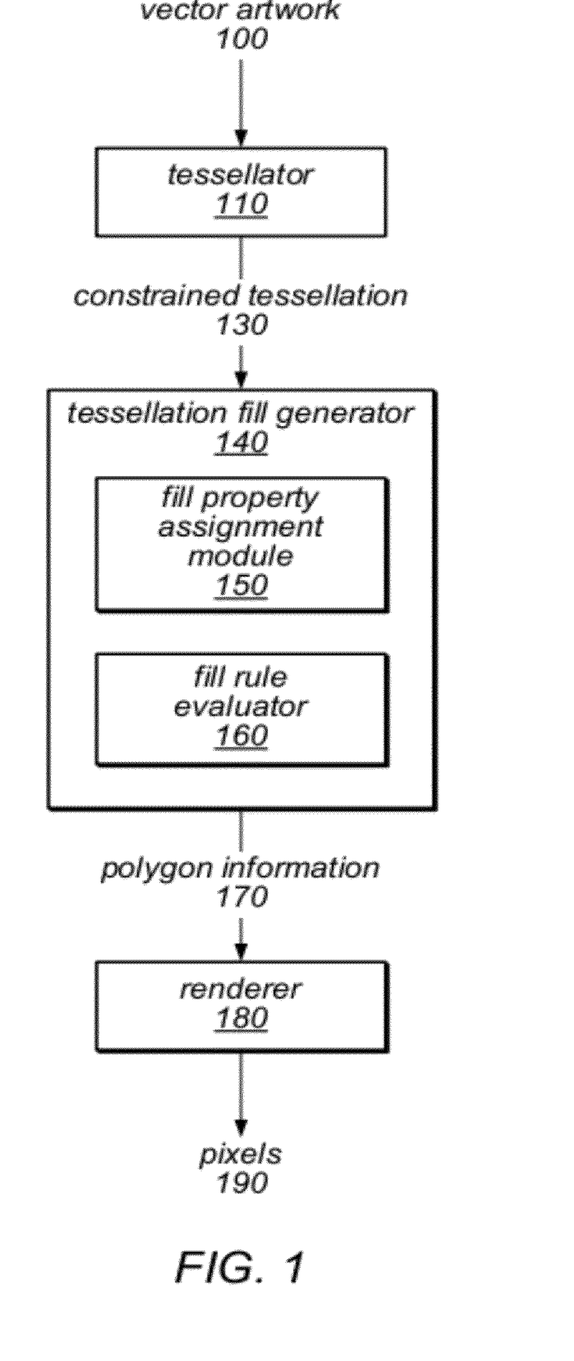
FIG. 1 illustrates a workflow for rendering vector artwork into pixels, according to some embodiments.

FIG. 1 illustrates an embodiment of a workflow for converting vector artwork 100 into displayable pixels 190. Vector artwork 100 comprises one or more geometrical primitives, and a fill property for each geometrical primitive. Geometrical primitives are defined by mathematical descriptions of lines and curves (e.g. Bezier curves). Fill properties describe how areas defined by the geometrical primitives of the vector artwork 100 appear on a display (e.g. what color an area should be). A fill property may comprises a fill rule and paint information. Fill rules can be of various types. An example of a fill rule type for an area in vector artwork is the even-odd rule. The even-odd rule conceptually draws a ray from a pixel inside a closed area to infinity and counts the number of paths (lines or curves) that the ray crosses. If the number of paths crossed is odd then the pixel is "inside" and may be given the color for "inside", otherwise the pixel is "outside" and may be given an "outside" color. Another type of fill rule is the winding rule. A winding fill rule determines the color of the pixel by the number of times that a path winds around the pixel. Other, arbitrarily complex, fill rules can be constructed. Some rules may depend on the state of a neighboring area or on some other state information. Paint information (or "color") may describe the color value, opacity, texture of other visual characteristic that may be assigned to a pixel. The paint information specifies the appearance (or "fill") of a corresponding area. For example, the paint information may specify a solid color, a bitmap texture (with a corresponding world transform matrix), a gradient (with matrices), etc.

Mathematical descriptions and fill properties are not directly displayable on a display device and may be processed to create pixels. In the embodiment illustrated in FIG. 1, vector artwork 100 may be applied as input to tessellator 110. Tessellator 110 transforms the geometrical primitives in vector artwork 100 into a constrained tessellation 130. Constrained tessellation 130 comprises one or more tessellation primitives within a boundary. The tessellation primitives are simple convex polygons. Typically, but not necessarily, the polygons are triangles. Constrained tessellation 130 may have the property that all edges in vector artwork 100 are represented in constrained tessellation 130 by one or more straight, non-intersecting, line segments (e.g. a Planar Straight Line Graph or PLSG). Straight line segments in vector artwork 100 may be represented directly in constrained tessellation 130 or may be represented as a set of line segments. Curved lines in vector artwork 100 may be approximated by sets of line segments. Tessellator 110 may add edges to constrained tessellation in order to create the tessellation primitives. The tessellation primitives in constrained tessellation 130 may have fill values. The fill value for a tessellation primitive describes how it will be displayed (e.g. its color). The tessellation primitives created by tessellator 110 may have no fill value assigned initially.

Constrained tessellation 130 may be input to tessellation fill generator 140 to produce polygon information 170. In some embodiments, polygon information 170 may comprise vertices and/or indices, as well as color/texture (e.g. fill values). Tessellation fill generator 140 comprises fill property assignment module 150 and fill rule evaluator 160. Fill property assignment module 150 may assign a fill property to each edge of each tessellation primitive in constrained tessellation 130. The fill property may specify a fill rule and paint information. An edge that represents or approximates an edge in vector artwork 100 is assigned the fill property of the respective edge in vector artwork 100.

Edges added by tessellator 110 which are not in vector artwork 100 are assigned a pass-through fill rule. Edges in constrained tessellation 130 need not all be assigned the same type of fill rule. Vector artwork 100 may contain a plurality of types of fill rules (e.g. even-odd rule and winding rule types), resulting in edges in constrained tessellation 130 having a plurality of different fill rule types. The fill rules may be of arbitrary complexity, requiring state information (e.g. an edge counter) to evaluate.

Fill rule evaluator 160 evaluates the fill rules assigned to edges of tessellation primitives in constrained tessellation 130. For an edge, fill rule evaluator 160 accesses state information (typically from a neighboring tessellation primitive) and the fill rule for an edge. The state information may comprise state information that may be used to evaluate a fill rule (e.g. an edge counter). In some embodiments, the state information may comprise a fill value. The fill rule is evaluated based on the state information and selects a fill value for a tessellation primitive to which the edge belongs. Based on the fill rule evaluation, the fill value for the tessellation primitive may be selected as the fill value from the state information or from the paint information of the fill property assigned to the edge. If the fill rule is the pass-through fill rule, an input fill value is copied for the fill value for the tessellation primitive (e.g., the fill value may be selected from the state information. In some embodiments, evaluating the fill rule may also set or update state information for the tessellation primitive.

To evaluate a fill rule, fill rule evaluator 160 determines a given tessellation primitive with an edge for which the state information is available to evaluate the edge's fill rule. The needed state information will be available for an edge that is shared with a tessellation primitive that already has a fill value. The needed state information will also be available for tessellation primitives having an edge that coincides with the boundary of the constrained tessellation. For a boundary edge the needed state information may be background or default state information (which may include a background color as the input fill value). In some embodiments, fill rule evaluator 160 selects a boundary edge as the first edge to evaluate. Fill rule evaluator 160 evaluates the fill rule for the edge of the given tessellation primitive to select a fill value to assign to the given tessellation primitive. The fill value of the given tessellation primitive may also be included as part of the state information that may allow the fill rule for an edge of an adjacent tessellation primitive to be evaluated. In some embodiments, fill rule evaluator 160 may select another tessellation primitive to evaluate and may continue evaluating fill rules until all tessellation primitives have been assigned fill values. In some embodiments, fill rule evaluator 160 may assign fill values to tessellation primitives adjacent to tessellation primitives with assigned fill values before selecting another boundary tessellation primitive. In some embodiments, fill rule evaluator 160 may assign fill values to only a subset of the tessellation primitives.

In some embodiments, tessellation fill generator 140 converts the tessellation primitives and fill values to polygon information 170 suitable for rendering (e.g., by a graphics processing unit (GPU)). Polygon information 170 may be processed by renderer 180 (e.g., within a GPU). Renderer 180 generates pixels 190 as output. Pixels 190 may be sent to a suitable display device or stored in a computer readable storage medium, such as system memory, a disk drive, DVD, CD, etc., for future display or additional processing.

In some embodiments, the modules illustrated in FIG. 1 may be implemented on a CPU. The modules may be divided between a CPU and a graphics processing unit (GPU). In some embodiments tessellator 110 and tessellation fill generator 140 may be implemented on a CPU and renderer 180 may be implemented on a GPU.

Flowchart of an Embodiment

Figure 2:
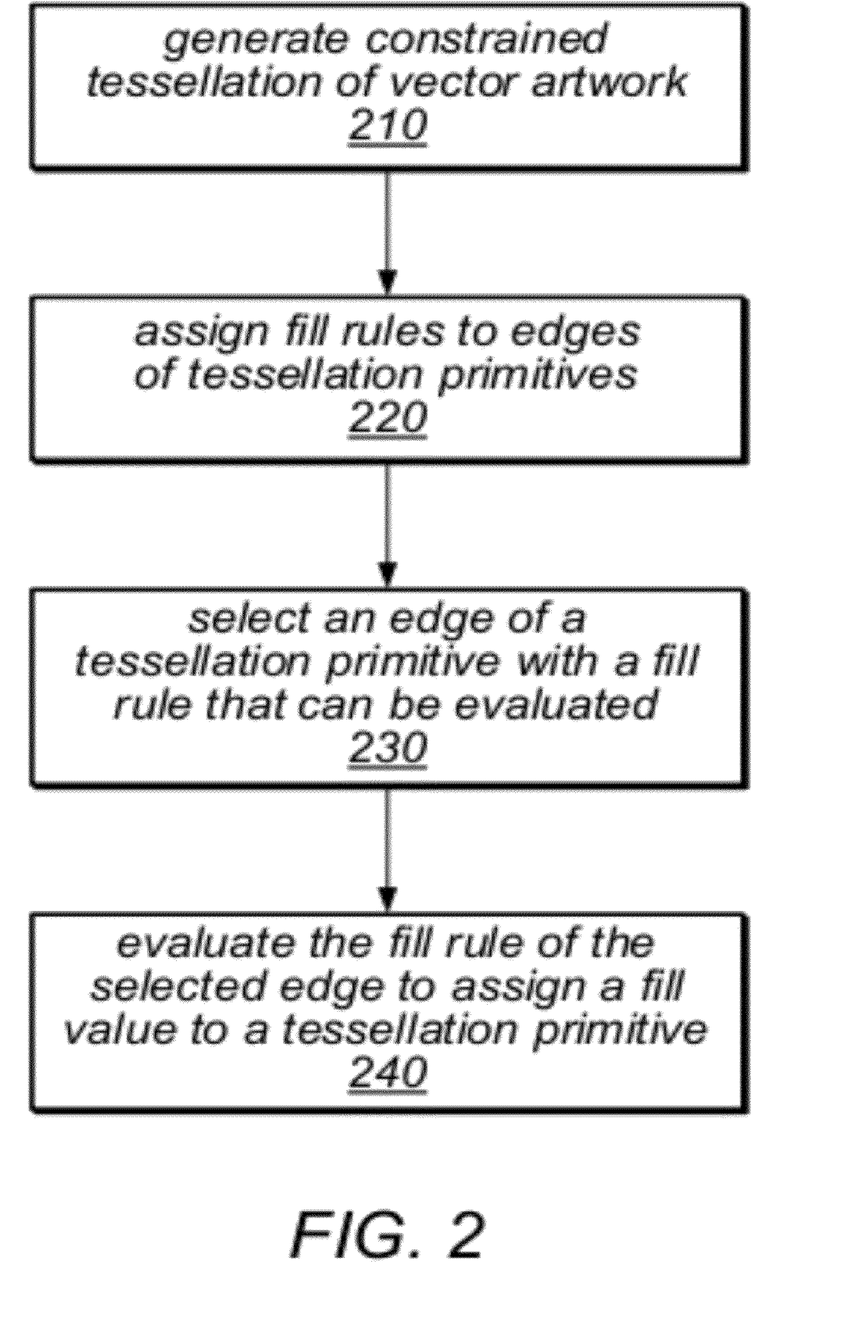
FIG. 2 is a flowchart of a method for creating a tessellation from vector artwork and filling tessellation primitives, according to some embodiments.

FIG. 2 is a flowchart of a method for creating filled tessellation primitives according to some embodiments. In some embodiments, some or all of the method may be performed by a software application or other program instructions executing on one or more computer processors (e.g., CPU(s)). As indicated at 210, a constrained tessellation is generated from vector artwork. For example, a software application may read a vector artwork file from memory and generate the constrained tessellation. For example, tessellator 110 in FIG. 1 may be a module of such a software application. Vector artwork comprises one or more geometrical primitives and a fill property for each geometrical primitive. The one or more geometrical primitives comprise one or more geometrical shapes and may be surrounded by a boundary. The boundary may be any of various boundaries as are known in the art. Examples of suitable boundaries include, but are not limited to, bounding boxes, spheres and convex hulls. A fill property may comprises a fill rule and paint information.

Generating the constrained tessellation as indicated in 210 may comprise two sub-steps. In the first sub-step, the geometrical primitives of the vector artwork may be approximated by a set of planar, non-intersecting straight edges. Various methods for creating such an approximation are known in the art. In the second sub-step, the set of planar, non-intersecting straight edges is used as input to a constrained tessellation method. Constrained tessellation methods are also known in the art. Examples of suitable tessellation methods include constrained Delaunay triangulation or simple constrained triangulation. The resulting output tessellation comprises a set of tessellation primitives. These tessellation primitives are typically triangles but may be any simple convex polygon. The set of tessellation primitives has the property that each straight edge in the input set of planar, non-intersecting straight edges is an edge of at least one tessellation primitive.

Continuing with FIG. 2, the method assigns a fill property to each edge of each tessellation primitive in the constrained tessellation as indicated in 220. An edge of a tessellation primitive that is an edge in the input set of planar, non-intersecting straight edges is assigned a fill property from respective edge of the vector artwork. Edges generated by the tessellation method that are not part of the input set are assigned a pass through fill rule.

As indicated in 230, an edge of a given tessellation primitive is selected. The selection is performed to select a tessellation primitive edge having an assigned fill rule that is ready to be evaluated. The state information needed to evaluate a fill rule may be available for a boundary edge or for an edge shared with an adjacent tessellation primitive which already has an assigned fill value. As indicated in 240, a fill value is selected for the given tessellation primitive by evaluating the fill rule assigned to the edge selected in 230. The assigned fill value may be selected from paint information of the input state information or from paint information of the edge's fill property. In some embodiments steps 230 and 240 may be repeated so that fill values are determined for all tessellation primitives. In other embodiments fill values are determined for only a subset of tessellation primitives.

Stack Based Embodiment for Assigning Fill Values

Figure 3:
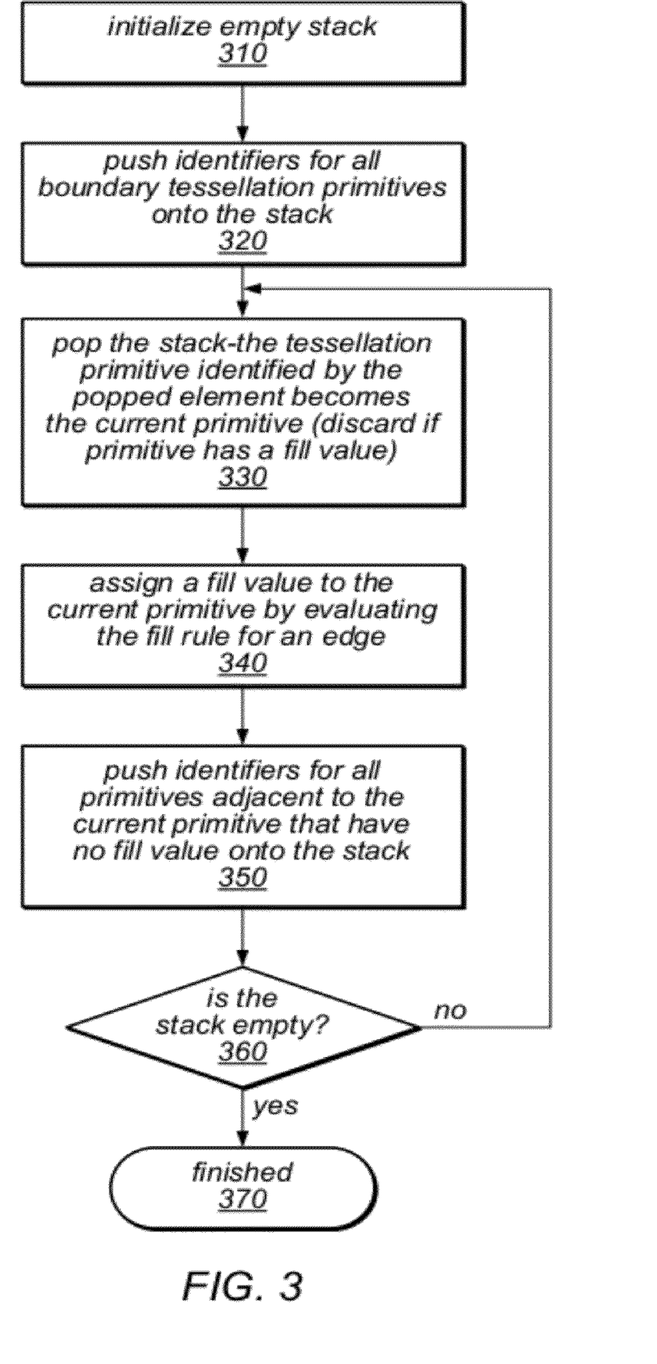
FIG. 3 is a flowchart for a stack-based implementation of a method of assigning fill values to tessellation primitives, according to some embodiments.

FIG. 3 illustrates an embodiment of a stack-based fill rule evaluation method for assigning fill values to the tessellation primitives in a constrained tessellation 130. Stacks are known in the art. A stack may hold any number of elements. A push operation adds an element to the top of the stack. A pop operation removes the top element of the stack. A stack may be tested to determine if it is empty. The method begins by initializing an empty stack capable of holding identifiers for tessellation primitives as in 310. Tessellation primitives which have at least one boundary edge are identified and identifiers for these tessellation primitives are pushed onto the stack in 320. The order in which the identifiers are pushed onto the stack may be unimportant. The fill rule for a boundary edge uses background state information, so all of the identifiers on the stack identify tessellation primitives with least one edge with a fill rule that can be evaluated.

The method proceeds by looping. As indicated in 330, an identifier is popped from the stack and the tessellation primitive identified by the popped identifier becomes the current tessellation primitive. In some embodiments, the current tessellation primitive may already have a fill value. For example, when neighboring tessellation primitives are pushed onto the stack (see 350 below), one or more of the neighboring tessellation primitives may have already been assigned a fill value. If the current tessellation primitive has a fill value then the current tessellation primitive may be discarded and another identifier may be popped from the stack to identify a replacement current tessellation primitive. If the current tessellation primitive has no fill value assigned, a fill rule for an edge of the current tessellation primitive is selected and evaluated in 340. There may be more than one edge with all of the needed state information available. The fill rule evaluation selects a fill value. The selected fill value is assigned to the current tessellation primitive. Identifiers for all tessellation primitives which share an edge with the current tessellation primitive are pushed onto the stack. In some embodiments, only tessellation primitives which share an edge with the current tessellation primitive and which have no fill value assigned are pushed onto the stack. Identifiers pushed onto the stack in 350 identify tessellation primitives that possess at least one edge with a fill rule that can be evaluated (i.e. the edge shared with the current tessellation primitive). The stack is tested in 360. If the stack is not empty, the method returns to 330 to pop the identifier for another tessellation primitive. If the stack is empty the method is finished, as in 370.

An example of tessellation based fill rule evaluation of vector artwork according to some embodiments is illustrated in FIG. 4. FIG. 4A illustrates vector artwork FIG. 400 surrounded by a boundary 410. Vector artwork 400 and boundary 410 comprise a set of geometrical primitives defined by mathematical descriptions of lines and curves (e.g. Bezier curves). Geometrical primitives of vector artwork 400 and boundary 410 have associated fill properties comprising fill rules and paint information. Fill rules may be assigned by various methods including, but not limited to, user input to a geometrical artwork computer application or assignment of default properties to automatically generated primitives. The geometrical primitives of vector artwork 400 are represented by artwork edges 420 as illustrated in FIG. 4B. Artwork edges 420 are straight, non-intersecting line segments. Straight line segment portions of vector artwork 400 are represented directly in artwork edges 420. Curved lines in vector artwork 400 are approximated by line segments in artwork edges 420. Graphical primitives for boundary 410 are similarly represented by boundary edges 430. Boundary edges 430 are also straight non-intersecting line segments. Algorithms for approximating graphical primitives by line segments are known in the art.

Continuing with FIG. 4, a constrained tessellation method is applied to artwork edges 420 and boundary edges 430. The artwork edges 420 and boundary edges 430 are geometric constraints on the tessellation method and appear as edges in the output tessellation shown in FIG. 4C. The tessellation method adds additional edges 450, shown as broken lines in FIG. 4C. Taken together artwork edges 420, boundary edges 430, and additional edges 450 form a set of tessellation primitives 460. The tessellation primitives 460 may be any convex polygon. In this example the convex polygons are triangles, but other tessellation primitive shapes can be used in conjunction with a relevant implementation. Algorithms for creating a constrained tessellation from a set of line segments are known in the art. Artwork edges 420 are assigned fill properties based on the fill rules and paint information of the input vector artwork 400. In this example each artwork edge 420 is assigned an even-odd fill property, and each boundary edge 430 is assigned a pass-through fill property (since none of the boundary edges correspond to edges of geometrical primitives of the vector artwork). Each additional edge 450 is also assigned a pass-through fill property.

Fill rules for artwork edges 420, boundary edges 430 and additional edges 450 are evaluated to determine fill values for tessellation primitives 460, e.g., as described above. In some embodiments, evaluation of the fill rules associated with edges of tessellation primitives may be performed in any order consistent with the constraint that all state information necessary for the evaluation of a fill rule must be available before the fill rule may be evaluated. By way of illustration, fill rules for boundary edges 430 may be evaluated at any time because background state information may be used to evaluate the rule. The state information needed for fill rules for edges that are not boundary edges may be evaluated when the tessellation primitive on one side of the edge has a defined fill value. In some embodiments, these characteristics are used to assign fill values first to tessellation primitives 460 that have boundary edges. In the example illustrated in FIG. 4C, boundary tessellation primitives are identified with an 'S' annotation.

Figure 4A:
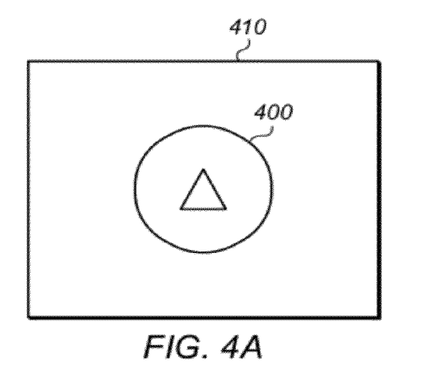
FIGS. 4A-4G illustrate creating a tessellation from vector artwork and filling tessellation primitives, according to some embodiments.
Figure 4B:
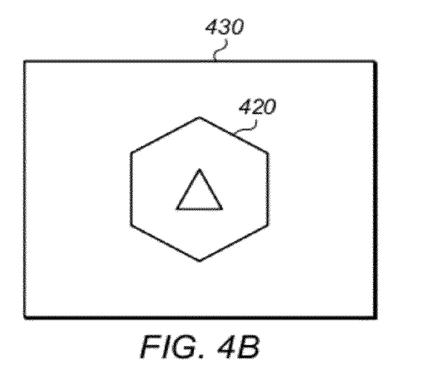
Figures 4C, 4D:
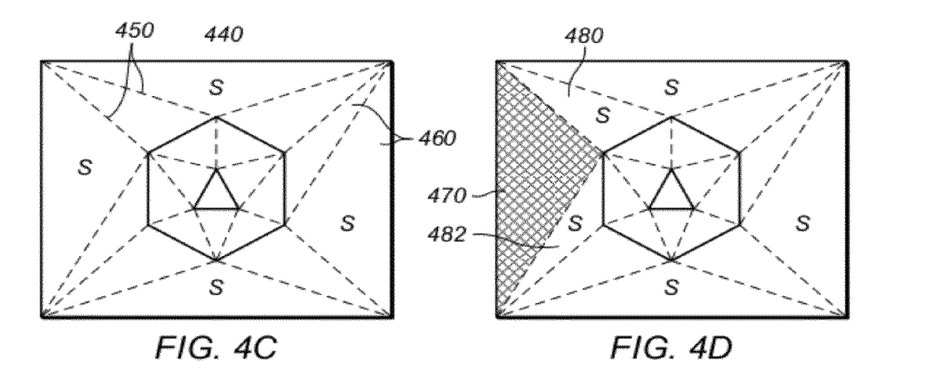

In FIG. 4D, the fill rule for the boundary edge of tessellation primitive 470 is evaluated. Since the edge is a boundary edge, background state information is used to evaluate the fill rule. Each boundary edge 430 was assigned a pass-through fill rule, so the evaluation selects the paint information from the background state information and assigns the selected paint information as the fill value for tessellation primitive 470. Tessellation primitive 470 can now provide state information allowing the evaluation of the fill rules for edges that tessellation primitive 470 shares with tessellation primitives 480 and 482. In FIG. 4D tessellation primitives 480 and 482 are annotated with an 'S' to indicate that they may be selected to have a fill rule evaluated.

Figure 4E:
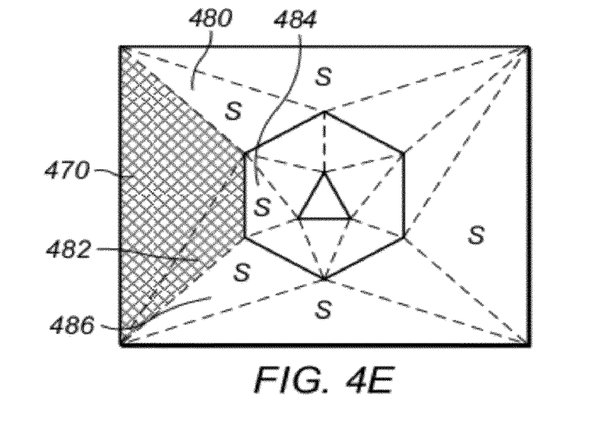

In FIG. 4E, the fill rule for the edge that tessellation primitive 482 shares with tessellation primitive 470 is evaluated. The edge between tessellation primitives 482 and 470 was added by the tessellation method and was assigned a pass-through fill rule. The result of evaluating the pass-through fill rule for the edge is to select the paint information from the input state information (the state information for tessellation primitive 470) and assign that paint information as the fill value for tessellation primitive 482. Tessellation primitive 482 can provide input state information to evaluate the fill rules for edges of two additional tessellation primitives. In FIG. 4E tessellation primitives 484 and 486 are annotated with an 'S' to indicate that they may be selected to have a fill rule evaluated.

Figure 4F:
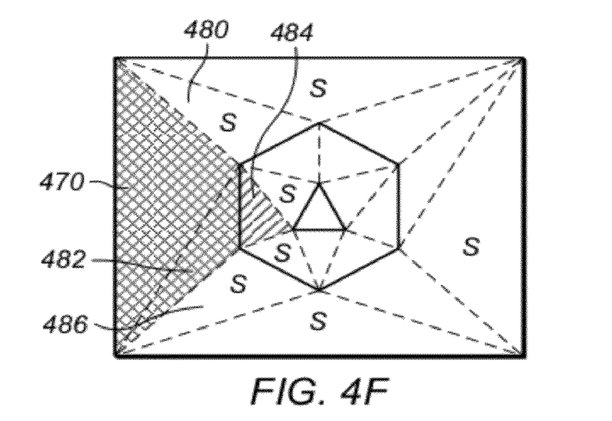
Figure 4G:
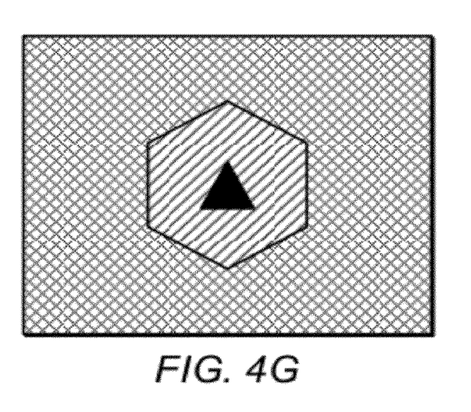

FIG. 4F illustrates the evaluation of a fill rule to assign a fill value to tessellation primitive 484. The edge shared by tessellation primitives 482 and 484 is an artwork edge and was assigned an even-odd fill property. State information for tessellation primitive 482 provides the input state information for the rule. Evaluating the rule determines that tessellation primitive 484 is inside an odd number of artwork edges, and assigns the paint information of the fill property of the edge as the fill value for tessellation primitive 484.

Assigning fill values to unfilled tessellation primitives that are adjacent to tessellation primitives with fill values continues until fill values are determined for all tessellation primitives. The result of this method is illustrated in FIG. 4F.

Recursion Based Method for Assigning Fill Values

In some embodiments, recursion may be used to implement a fill rule evaluator (e.g., fill rule evaluator 160). Pseudocode for an example recursive implementation that may be used in some embodiments is:

```
for ( All Border Tessellation Primitives t ) {
    EvaluateRecursive ( t );
}
EvaluateRecursive ( TessellationPrimitive t ) {
    if ( t.fillvalue != undefined ) return;
    for ( All Edges of t e )
        if ( e Has Neighbor n )
            if ( n.fillvalue != undefined )
                t.fillvalue = e.fillrule(n.fillvalue,e.paint_information);
        else
            t.fillvalue = e.fillrule (background.fillvalue,e.paint_information)
    for ( All Edges of t e )
        if (e Has Neighbor n)
            EvaluateRecursive ( n );
}
```

The method evaluates the function EvaluateRecursive for all tessellation primitives that have at least one boundary edge (i.e. the Border Tessellation Primitives). If its argument tessellation primitive has no fill value, function EvaluateRecursive assigns a fill value to its argument tessellation primitive and calls itself for each neighboring tessellation primitive that does not have a fill value. The method ends when the last call to the EvaluateRecursive function on a Border Tessellation Primitive returns.

The EvaluateRecursive function first checks the fill value for its argument tessellation primitive. If a fill value for its argument tessellation primitive is defined the function returns. If the fill value for its argument tessellation primitive is undefined then the function loops over all of the edges of the tessellation primitive argument. For each edge of the argument tessellation primitive the function determines whether the edge is shared with an adjacent tessellation primitive (in other words, if the argument tessellation primitive has a neighbor). If there is an adjacent tessellation primitive and if the adjacent tessellation primitive does not have an undefined fill value (that is, if the adjacent tessellation primitive has a defined fill value), then the fill rule for the shared edge is evaluated and the resulting fill value is assigned to the argument tessellation primitive. If there is not an adjacent tessellation primitive (i.e. if the edge is a boundary edge) then the fill rule for the edge is evaluated using a background fill value and the resulting fill value is assigned to the argument tessellation primitive. The EvaluateRecursive function then loops over all edges of the argument tessellation primitive a second time, calling itself for each adjacent tessellation primitive.

Detection of Conflicting Fill Rules

Figure 5:
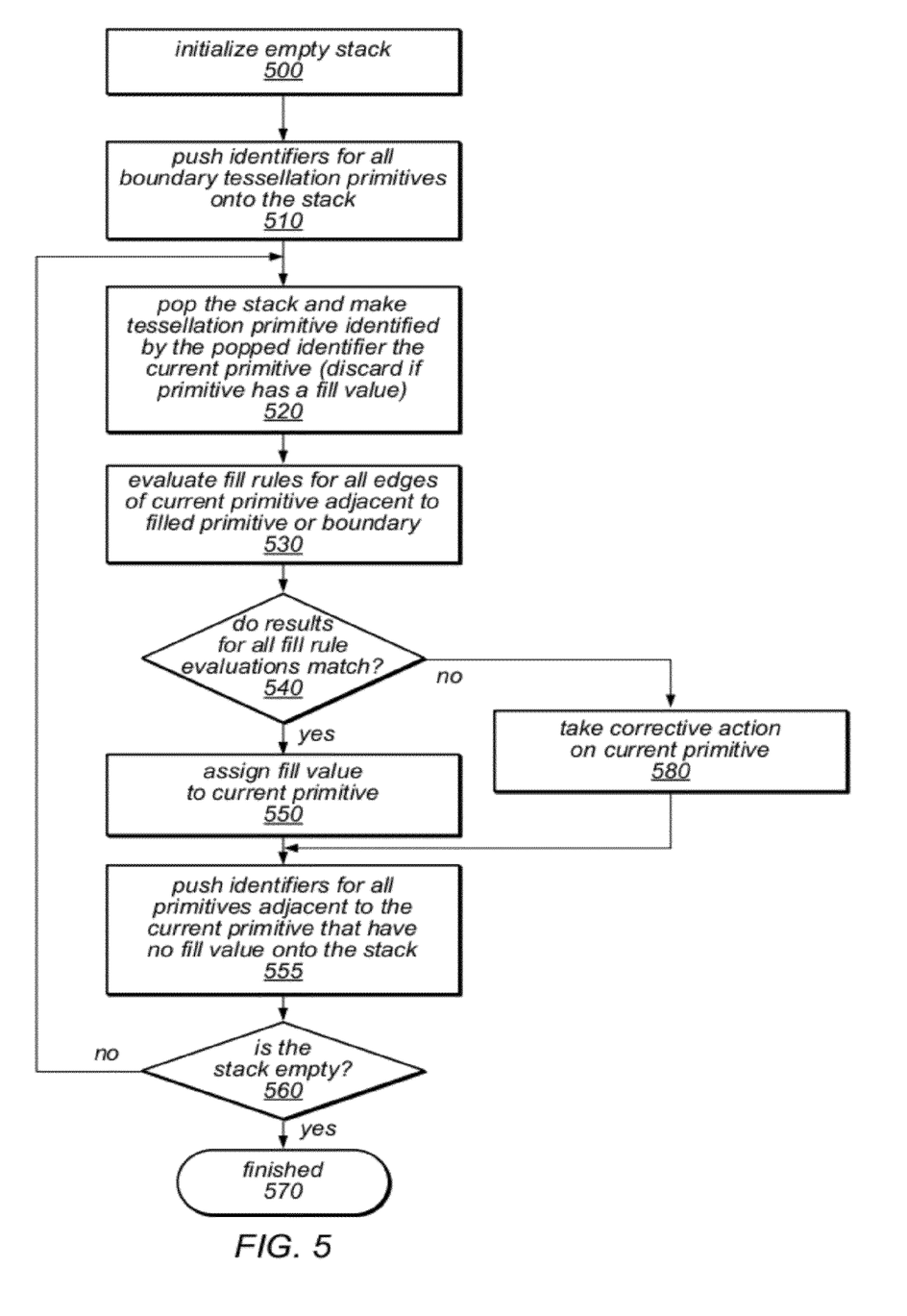
FIG. 5 is a flowchart of a method for assigning fill values to tessellation primitives while detecting conflicting fill rules, according to some embodiments.

FIG. 5 illustrates a flowchart of an embodiment of fill rule evaluator 160 that detects conflicts among fill rules. As in the method illustrated in FIG. 3, a stack is initialized in 500. The stack will hold identifiers for tessellation primitives. The stack is initially empty. Tessellation primitives that have at least one boundary edge are identified and identifiers for only these tessellation primitives are pushed onto the stack in 510. The fill rule for a boundary edge is evaluated using background state information, thus all of the tessellation primitives on the stack have at least one edge for which a fill rule can be evaluated. The order in which the identifiers are pushed is unimportant.

The method proceeds by looping. In 520 the top stack element is popped and the tessellation primitive identified by the popped element becomes the current tessellation primitive. At least one edge of the current tessellation primitive will have a fill rule that can be evaluated because only identifiers for tessellation primitives with such an edge are pushed onto the stack. In some embodiments, the current tessellation primitive may already have a fill value. If the current tessellation primitive has a fill value then the current tessellation primitive may be discarded and another identifier may be popped from the stack to identify a replacement current tessellation primitive. In 530, each edge of current tessellation primitive is examined. If the state information required to evaluate the fill rule for the edge is available, then the rule is evaluated and the fill value selected by the rule is temporarily stored. In 540, the temporarily stored fill values are compared. If all of the temporarily stored fill values match, then the fill value is assigned to the current tessellation primitive as in 550. If there is only one temporarily stored fill value, then that fill value is assigned to the current tessellation primitive in 550. Identifiers for all tessellation primitives which share an edge with the current tessellation primitive and which have no fill value are pushed onto the stack. Identifiers pushed onto the stack in 555 identify tessellation primitives that possess at least one edge with a fill rule that can be evaluated (i.e. the edge shared with the current tessellation primitive). The stack is then examined, in 560. If the stack is not empty then the method returns to 530 to pop another identifier from the stack. If the stack is empty then the method is finished, as in 570.

In the comparison in 540, if the temporarily stored fill values given by a plurality of fill rules do not match then corrective action is taken in 580. In various embodiments the corrective action may take one of several forms. The current tessellation primitive may be assigned no fill value or a null fill value. In another embodiment, the current tessellation primitive may be assigned a fill value selected from among the plurality of temporarily stored fill values. The fill value with the greatest number of occurrences in the temporarily stored fill values may be selected. If two or more temporarily stored fill values have the same number of occurrences one may be selected arbitrarily. In another embodiment, corrective action comprises storing identifiers of tessellation primitives with fill rule conflicts for later processing. After corrective action is taken the method proceeds to 560. The stack is examined. If the stack is not empty the method returns to 530 to pop another identifier from the stack.

If in 580 the corrective action comprises storing identifiers for tessellation primitives with fill rule conflicts for later processing, the tessellation primitives with fill rule conflicts may be examined after the method of FIG. 5 is finished. A fill value may be assigned to a tessellation primitive with a fill rule conflict by selecting the fill value determined by a majority of the fill rules for the tessellation primitive's edges.

Example System

Figure 6:
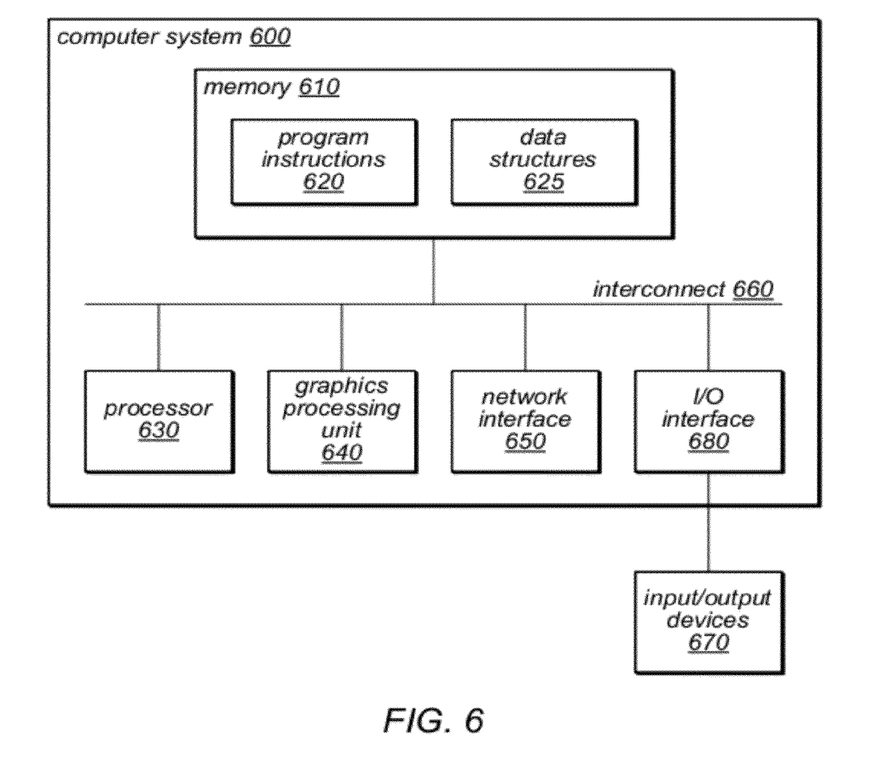
FIG. 6 illustrates an example computer system that may be used in embodiments.

Embodiments of a method for fill rule evaluation over a tessellation as described herein may be executed on one or more computer systems, which may interact with various other devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 600 includes one or more processors 630 coupled to a system memory 610 via interconnect 660. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 630, or a multiprocessor system including several processors 630 (e.g., two, four, eight, or another suitable number). Processors 630 may be any suitable processor capable of executing instructions. For example, in various embodiments, processors 630 may be general-purpose or embedded processors implementing any of a variety of instruction set architectures (ISAs), such as the x86, PowerPC, SPARC, or MIPS ISAs, or any other suitable ISA. In multiprocessor systems, each of processors 630 may commonly, but not necessarily, implement the same ISA.

In some embodiments, at least one graphics processing unit 640 may be included. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 610 may be configured to store program instructions and/or data accessible by processor 630. In various embodiments, system memory 610 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a fill rule evaluation over a tessellation module, are shown stored within system memory 610 as program instructions 620 and data structure(s) 625, respectively. In other embodiments, program instructions and/or data may be received, sent or stored upon different types of computer-accessible media or on similar media separate from system memory 610 or computer system 600. Generally speaking, a computer-accessible medium may include storage media or memory media such as magnetic or optical media, e.g., disk or CD/DVD-ROM coupled to computer system 600 via I/O interface 680. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 650.

In one embodiment, I/O interface 680 may be configured to coordinate I/O traffic between processor 630, system memory 610, and any peripheral devices in the device, including network interface 650 or other peripheral interfaces, such as input/output devices 670. In some embodiments, I/O interface 680 may perform any necessary protocol, timing or other data transformations to convert data signals from one component (e.g., system memory 610) into a format suitable for use by another component (e.g., processor 630). In some embodiments, I/O interface 680 may include support for devices attached through various types of peripheral buses, such as a variant of the Peripheral Component Interconnect (PCI) bus standard or the Universal Serial Bus (USB) standard, for example. In some embodiments, the function of I/O interface 680 may be split into two or more separate components, such as a north bridge and a south bridge, for example. In addition, in some embodiments some or all of the functionality of I/O interface 680, such as an interface to system memory 610, may be incorporated directly into processor 630.

Network interface 650 may be configured to allow data to be exchanged between computer system 600 and other devices attached to a network, such as other computer systems, or between nodes of computer system 600. In various embodiments, network interface 650 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 670 may, in some embodiments, include one or more display terminals, keyboards, keypads, touchpads, scanning devices, voice or optical recognition devices, or any other devices suitable for entering or retrieving data by one or more computer system 600. Multiple input/output devices 670 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 650.

As shown in FIG. 6, memory 610 may include program instructions 620, configured to implement embodiments of a module for fill rule evaluation over a tessellation as described herein, and data structure(s) 625, comprising various data accessible by program instructions 620. In one embodiment, program instructions 620 may include software elements of embodiments of a module for fill rule evaluation over a tessellation as illustrated in the above Figures. Data structure(s) 625 may include data that may be used in embodiments. In other embodiments, other or different software elements and data may be included.

Those skilled in the art will appreciate that computer system 600 is merely illustrative and is not intended to limit the scope of a module for fill rule evaluation over a tessellation as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer implemented method, comprising:
performing, by one or more computers:
generating a constrained tessellation of vector artwork, wherein the vector artwork comprises one or more geometrical primitives and a fill property for each geometrical primitive, wherein each fill property specifies a fill rule and paint information, wherein the constrained tessellation comprises a plurality of tessellation primitives within a boundary;
for each tessellation primitive edge representing an edge in the vector artwork, assigning to that edge a corresponding fill property from the vector artwork, and for each tessellation primitive edge not representing an edge in the vector artwork, assigning to that edge a pass-through fill rule;
for a given tessellation primitive, determining an edge that is shared with an adjacent tessellation primitive for which a fill value has already been determined or is a boundary edge;
evaluating the fill rule assigned to the determined edge of the given tessellation primitive, wherein said evaluating comprises:
if the fill rule for the determined edge is pass-through, assigning a fill value for the given tessellation primitive to an input fill value, wherein the input fill value is the fill value of the adjacent tessellation primitive if the determined edge is shared with the adjacent tessellation primitive and is a background fill value if the determined edge is a boundary edge; and
if the fill rule for the determined edge is not pass-through, assigning a fill value for the given tessellation primitive according to the fill rule of the determined edge.

2. The computer implemented method of claim 1, wherein the determined edge is shared with an adjacent tessellation primitive for which a fill value has already been determined, and wherein assigning a fill value for the given tessellation primitive according to the fill rule of the determined edge comprises:
accessing fill rule state information for the adjacent tessellation primitive;
evaluating the fill rule based on the state information; and
according to the result of the evaluation assigning to the given tessellation primitive a fill value from the fill rule state information or a fill value from the paint information.

3. The computer implemented method of claim 1, further comprising:
repeating for the remaining tessellation primitives:
said determining an edge that is shared with an adjacent tessellation primitive for which a fill value has already been determined or is a boundary edge; and
said evaluating the fill rule assigned to the determined edge of the given tessellation primitive.

4. The computer implemented method of claim 1, further comprising:
for the given tessellation primitive, determining an other edge this is shared with an adjacent tessellation primitive for which a fill value has already been determined or is a boundary edge;
evaluating the fill rule assigned to the other edge of the given tessellation primitive; and
determining whether a fill rule conflict exists by comparing the fill value assigned by evaluating the fill rule of the determined edge with the fill value assigned by evaluating the fill rule of the determined other edge.

5. The computer implemented method of claim 4, further comprising:
if a fill rule conflict exists assigning to the given tessellation primitive:
no fill value;
the fill value assigned by evaluating the fill rule of the determined edge; or
the fill value assigned by evaluating the fill rule of the determined other edge.

6. The computer implemented method of claim 1, wherein the vector artwork comprises a plurality of geometric primitives and the fill properties comprise at least two types of fill rules.

7. The computer implemented method of claim 1, further comprising converting the tessellation primitives and fill values to polygon information, and sending the polygon information to a graphics processing unit (GPU) for rendering.

8. A system, comprising:
- at least one processor; and
- a memory comprising program instructions, wherein the program instructions are executable by the at least one processor to:
  - generate a constrained tessellation of vector artwork, wherein the vector artwork comprises one or more geometrical primitives and a fill property for each geometrical primitive, wherein each fill property specifies a fill rule and paint information, wherein the constrained tessellation comprises a plurality of tessellation primitives within a boundary;
  - for each tessellation primitive edge representing an edge in the vector artwork, assign to that edge a corresponding fill property from the vector artwork, and for each tessellation primitive edge not representing an edge in the vector artwork, assign to that edge a pass-through fill rule;
  - for a given tessellation primitive, determine an edge that is shared with an adjacent tessellation primitive for which a fill value has already been determined or is a boundary edge;
  - evaluate the fill rule assigned to the determined edge of the given tessellation primitive, wherein said evaluate comprises:
    - if the fill rule for the determined edge is pass-through, assign a fill value for the given tessellation primitive to an input fill value, wherein the input fill value is the fill value of the adjacent tessellation primitive if the determined edge is shared with the adjacent tessellation primitive and is a background fill value if the determined edge is a boundary edge; and
    - if the fill rule for the determined edge is not pass-through, assign a fill value for the given tessellation primitive according to the fill rule of the determined edge.

9. The system of claim 8, wherein the determined edge is shared with an adjacent tessellation primitive for which a fill value has already been determined, and wherein, to assign a fill value for the given tessellation primitive according to the fill rule of the determined edge, the program instructions are executable by the at least one processor to:
- access fill rule state information for the adjacent tessellation primitive;
- evaluate the fill rule based on the state information; and
- according to the result of the evaluation assign to the given tessellation primitive a fill value from the fill rule state information or a fill value from the paint information.

10. The system of claim 8, wherein the program instructions are executable by the at least one processor to:
- repeat for the remaining tessellation primitives:
  - said determine an edge that is shared with an adjacent tessellation primitive for which a fill value has already been determined or is a boundary edge; and
  - said evaluate the fill rule assigned to the determined edge of the given tessellation primitive.

11. The system of claim 8, wherein the program instructions are executable by the at least one processor to:
- for the given tessellation primitive, determine an other edge this is shared with an adjacent tessellation primitive for which a fill value has already been determined or is a boundary edge;
- evaluate the fill rule assigned to the other edge of the given tessellation primitive; and
- determine whether a fill rule conflict exists by comparing the fill value assigned by evaluating the fill rule of the determined edge with the fill value assigned by evaluating the fill rule of the determined other edge.

12. The system of claim 8, wherein the vector artwork comprises a plurality of geometric primitives and the fill properties comprise at least two types of fill rules.

13. The system of claim 8, wherein the system further comprises a graphics processing unit (GPU), and wherein the program instructions are executable by the at least one processor to convert the tessellation primitives and fill values to polygon information, and send the polygon information to the GPU for rendering.

14. A non-transitory computer-readable storage medium storing program instructions, wherein the program instructions are computer-executable to implement:
- generating a constrained tessellation of vector artwork, wherein the vector artwork comprises one or more geometrical primitives and a fill property for each geometrical primitive, wherein each fill property specifies a fill rule and paint information, wherein the constrained tessellation comprises a plurality of tessellation primitives within a boundary;
- for each tessellation primitive edge representing an edge in the vector artwork, assigning to that edge a corresponding fill property from the vector artwork, and for each tessellation primitive edge not representing an edge in the vector artwork, assigning to that edge a pass-through fill rule;
- for a given tessellation primitive, determining an edge that is shared with an adjacent tessellation primitive for which a fill value has already been determined or is a boundary edge;
- evaluating the fill rule assigned to the determined edge of the given tessellation primitive, wherein said evaluating comprises:
  - if the fill rule for the determined edge is pass-through, assigning a fill value for the given tessellation primitive to an input fill value, wherein the input fill value is the fill value of the adjacent tessellation primitive if the determined edge is shared with the adjacent tessellation primitive and is a background fill value if the determined edge is a boundary edge; and
  - if the fill rule for the determined edge is not pass-through, assigning a fill value for the given tessellation primitive according to the fill rule of the determined edge.

15. The non-transitory computer-readable storage medium of claim 14 wherein the determined edge is shared with an adjacent tessellation primitive for which a fill value has already been determined, and wherein, in said assigning a fill value for the given tessellation primitive according to the fill rule of the determined edge the program instructions are computer-executable to implement:
- accessing fill rule state information for the adjacent tessellation primitive;
- evaluating the fill rule based on the state information; and
- according to the result of the evaluation assigning to the given tessellation primitive a fill value from the fill rule state information or a fill value from the paint information.

16. The non-transitory computer-readable storage medium of claim 14, wherein the program instructions are computer-executable to implement:
  repeating for the remaining tessellation primitives:
    said determining an edge that is shared with an adjacent tessellation primitive for which a fill value has already been determined or is a boundary edge; and
    said evaluating the fill rule assigned to the determined edge of the given tessellation primitive.

17. The non-transitory computer-readable storage medium of claim 14, wherein the program instructions are computer-executable to implement:
  for the given tessellation primitive, determining an other edge this is shared with an adjacent tessellation primitive for which a fill value has already been determined or is a boundary edge;
  evaluating the fill rule assigned to the other edge of the given tessellation primitive; and
  determining whether a fill rule conflict exists by comparing the fill value assigned by evaluating the fill rule of the determined edge with the fill value assigned by evaluating the fill rule of the determined other edge.

18. The non-transitory computer-readable storage medium of claim 17, wherein the program instructions are computer-executable to implement:
  if a fill rule conflict exists assigning to the given tessellation primitive:
    no fill value;
    the fill value assigned by evaluating the fill rule of the determined edge; or
    the fill value assigned by evaluating the fill rule of the determined other edge.

19. The non-transitory computer-readable storage medium of claim 14, wherein the vector artwork comprises a plurality of geometric primitives and the fill properties comprise at least two types of fill rules.

20. The non-transitory computer-readable storage medium of claim 14, wherein the program instructions are computer-executable to implement converting the tessellation primitives and fill values to polygon information, and sending the polygon information to a graphics processing unit (GPU) for rendering.

* * * * *